United States Patent
Hayashi et al.

(10) Patent No.: US 6,696,385 B2
(45) Date of Patent: Feb. 24, 2004

(54) METHOD OF PRESERVING SULFONIC ACID-TYPE CATION-EXCHANGE RESIN MODIFIED WITH THIOL-CONTAINING AMINE COMPOUND

(75) Inventors: Koichi Hayashi, Yokkaichi (JP); Hideto Hayashi, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/436,282

(22) Filed: May 13, 2003

(65) Prior Publication Data

US 2003/0211934 A1 Nov. 13, 2003

Related U.S. Application Data

(63) Continuation of application No. PCT/JP01/10588, filed on Dec. 4, 2001.

(30) Foreign Application Priority Data

Dec. 7, 2000 (JP) .......................................... 2000-372241

(51) Int. Cl.[7] .......................... B01J 27/02; B01J 20/34; B01J 49/00; C02F 1/42
(52) U.S. Cl. ...................... 502/216; 502/22; 502/402; 502/514; 521/32; 521/33; 210/670; 210/673; 210/675
(58) Field of Search ...................... 502/22, 216, 402, 502/514; 521/32, 33; 210/670, 673, 675

(56) References Cited

U.S. PATENT DOCUMENTS 4,160,675 A * 7/1979 Pannekeet et al. ........ 127/46 A
4,423,252 A * 12/1983 Maki et al. ................. 568/728
4,478,956 A * 10/1984 Maki et al. .................. 521/32
4,595,704 A * 6/1986 Fazio .......................... 521/31
5,087,767 A * 2/1992 Okamoto et al. ........... 568/727
6,608,234 B2 * 8/2003 Saruwatari ................... 568/728
2003/0013928 A1 * 1/2003 Saruwatari ................... 568/728

FOREIGN PATENT DOCUMENTS

| JP | 357035533 | * 2/1982 | ........... C07C/39/16 |
| JP | 08325185 | * 12/1996 | ........... C07C/39/16 |
| JP | 2002-1132 | 1/2002 | |
| JP | 2002-1133 | 1/2002 | |
| JP | 2002-1134 | 1/2002 | |
| JP | 2002-177797 | * 6/2002 | ............ B01J/39/18 |
| WO | WO 02/45855 | * 12/2001 | ............ B01J/39/18 |

* cited by examiner

*Primary Examiner*—Mark L. Bell
*Assistant Examiner*—Patricia L Hailey
(74) *Attorney, Agent, or Firm*—Oblon, Spivak, McClelland, Maier & Neustadt, P.C.

(57) ABSTRACT

The present invention aims at inhibiting a lowering in the modification ratio of a modified cation-exchange resin, in which part of the sulfonic acid groups have been modified with a thiol-containing amine compound and which is employed as a catalyst for producing bisphenol, during preservation. In the present invention, a modified cation-exchange resin is packed together with water into a container while regulating the surface area of the container to $0.5 \text{ m}^2$ or less per liter of the resin and then the container is sealed up so that the resin is preserved in a state of being soaked in water.

4 Claims, No Drawings

METHOD OF PRESERVING SULFONIC ACID-TYPE CATION-EXCHANGE RESIN MODIFIED WITH THIOL-CONTAINING AMINE COMPOUND

This application is a Continuation of International Application No. PCT/JP01/10588, filed Dec. 4, 2001.

TECHNICAL FIELD

The present invention relates to a method of preserving a cation-exchange resin modified with a thiol-containing amine compound in which a thiol-containing amine compound is bonded via ionic bonds to part of sulfonic acid groups of a sulfonic acid-type cation-exchange resin.

BACKGROUND ART

It is well known that sulfonic acid-type cation-exchange resins in which thiol-containing amine compounds are bonded via ionic bonds to part of the sulfonic acid groups are appropriate as catalysts for reaction of the production of bisphenol by reacting phenol compounds with ketones. Since sulfonic acid-type cation-exchange resins are usually marketed in the form of sodium salts, these sulfonic acid-type cation-exchange resins are converted into cation-exchange resins modified with a thiol-containing amine compound first by treating the marketed resins in the form of sodium salt with hydrochloric acid or the like. Subsequently, the free resins are treated with aqueous solutions of thiol-containing amine compounds so that the thiol-containing amine compounds are bonded to part of the sulfonic acid groups, thereby giving the aimed cation-exchange resins modified with a thiol-containing amine compound.

To produce bisphenol by using a cation-exchange resin modified with a thiol-containing amine compound as a catalyst, it has been usually a practice to continuously pass a feedstock fluid containing a phenol compound and a ketone through a fixed bed reactor packed with this catalyst. Since the catalytic activity of the cation-exchange resin modified with a thiol-containing amine compound is gradually lowered, it is necessary to replace the catalyst by a fresh one. For this replacement, it is needed to preliminarily prepare the catalyst in the manner as described above and preserve it. However, there arises a problem that the thiol groups in the cation-exchange resin modified with a thiol-containing amine compound decrease during this preservation time. The decrease in the thiol groups means a lowering of the catalytic activity. Therefore, there has been required a method of preserving a cation-exchange resin modified with a thiol-containing amine compound free from decrease in thiol groups. The present invention aims at satisfying this requirement.

DISCLOSURE OF THE INVENTION

According to the present invention, a decrease in thiol-containing amino groups in a resin during preservation can be inhibited by packing a modified sulfonic acid-type cation-exchange resin, in which a thiol-containing amine compound is bonded via ionic bonds to part of the sulfonic acid groups, together with water into a container while regulating the surface area of the container to 0.5 m² or less per liter of the resin and then sealing up the container so that the resin is preserved in a state of being soaked in water.

BEST MODE FOR CARRYING OUT THE INVENTION

As the thiol-containing amine compound to be used in modifying a sulfonic acid-type cation-exchange resin in the present invention, use can be made of thiol-containing amine compounds which have hitherto been employed for this purpose, for example, aminoalkanethiols such as 2-aminoethanethiol and ω-pyridylalkanethiols such as 2-(4-pyridyl)ethanethiol. As the sulfonic acid-type cation-exchange resin, use may be made of sulfonated products of styrene-divinylbenzene crosslinked copolymers which have been most commonly employed. Either gel-type resins or porous resins may be used therefor. If desired, it is also possible to use resins of other types such as sulfonated products of phenol-formaldehyde resins. As the sulfonic acid-type cation-exchange resin, it is favorable to use a resin having a large exchange capacity.

As described above, the sulfonic acid-type cation-exchange resin modified with a thiol-containing amine compound may be prepared by converting a marketed resin of a sodium salt type into the free type and then bringing it into contact with a calculated amount of the thiol-containing amine compound. In general, 2 to 40% of the sulfonic acid groups are modified with the thiol-containing amine compound. In case where the modification ratio is less than 2%, the catalytic effect owing to the thiol-containing amine compound cannot be fully exerted. In case where the modification ratio exceeds 40%, the catalytic activity is lowered due to the decrease in free sulfonic acid. Thus, these cases are both unfavorable.

In the present invention, when the sulfonic acid-type cation-exchange resin modified with a thiol-containing amine compound is preserved in a sealed container, a container having a surface area of 0.5 m² or less per liter of the resin is used and the resin is preserved together with water in this container in a state of being soaked in water. According to studies by the present inventors, a decrease in the thiol-containing amine groups during preservation is caused by a change which is brought about by a reaction between the thiol groups with oxygen. Accordingly, the present inventors have conducted intensive studies on a method in which oxygen can be eliminated from a packaging container as far as possible and a material having high gas barrier properties is used in the packaging container. As a result, they have found out that the above method is effective. However, there still remain some problems including the working characteristics of the oxygen elimination method and the elevated price of the packaging container. As the results of the subsequent studies, they have found out that the change in the thiol groups due to the reaction with oxygen during preservation can be lessened by soaking the resin in water so as to eliminate air in the ion-exchange resin layer in the container as far as possible and reducing the surface area of the container per unit of the resin so as to minimize the invasion of oxygen into the container during preservation. According to the studies by the present inventors, the surface area of a container made of a commonly employed synthetic resin such as polyethylene or polypropylene should be regulated to 0.5 m² or less, preferably 0.05 m² or less, per liter of the resin. It is also preferable to control the surface area per mole of thiol group in the resin to 1 m² or less, still preferably 0.2 m² or less. In the step of sealing up the container containing the resin with water, it is furthermore preferable to use water from which dissolved oxygen has been eliminated and eliminate oxygen from the container by replacement with nitrogen gas or the like. Preservation is preferably conducted at ambient temperature or lower.

EXAMPLES

Now the present invention will be described in greater detail by reference to the following Examples.

This cation-exchange resin modified with a thiol-containing amine compound and water were packed into a high-density polyethylene container of 0.85 mm in thickness and the container was sealed up in a state where it was filled with water. After preserving at ambient temperature for 3 months, the container was opened and 2-(4-pyridyl) ethanethiol was quantified. Thus, the residual ratio was calculated.

Table-1 shows the results.

TABLE 1

| | Modification ratio of resin (%) | Capacity of container (L) | Volume of resin packed (L) | Surface area of container per L of resin (m²) | Surface area of container per mole of thiol group (m²) | Residual ratio of thiol group (%) |
|---|---|---|---|---|---|---|
| Ex. 1 | 16.7 | 0.25 | 0.135 | 0.2 | 0.9 | 96.4 |
| Ex. 2 | 16.7 | 10 | 8 | 0.04 | 0.2 | 98.8 |
| Ex. 3*[1] | 15.3 | 800 | 280 | 0.02 | 0.1 | 100 |
| Comp. Ex. 1 | 10.3 | 0.25 | 0.04 | 0.7 | 5 | 59.5 |

*[1]After covering with a sheet, preserved outdoor under direct rays.

In these examples, the modification ratios of resins and the residual ratios of thiol groups were calculated in accordance with the following formulae (each expressed in %).

$$\text{Modification ratio} = \frac{\text{No. of thiol-containing amine ompound moles under ionic bonding}}{\text{No. of total SO}_3\text{H-type sulfonic acid group moles before ionic bonding}} \times 100$$

$$\text{Residula ratio} = \frac{\text{No. of thiol-containing amine compound moles under ionic bonding after preserving 3 months}}{\text{No. of thiol-containing amine compound moles under ionic bonding before packing in container}} \times 100$$

Concerning the number of thiol-containing amine compound moles under ionic bonding, the number of moles per unit weight of the moisten catalyst was determined by the potassium iodate titration method.

Concerning the number of total SO₃H-type sulfonic acid group moles before ionic bonding, the number of moles per unit weight of the moisten catalyst was determined by the neutralization titration with sodium hydroxide.

Examples 1 to 3 and Comparative Example 1

A sulfonic acid-type cation-exchange resin (DIAION SK104, DIAION: trademark registered by Mitsubishi Chemical Corporation) was converted into the free type. Then it was poured into an aqueous solution of 2-(4-pyridyl) ethanethiol, stirred, filtered and washed with water to give a cation-exchange resin modified with a thiol-containing amine compound.

While the invention has been described in detail and with reference to specific embodiments thereof, it will be apparent to one skilled in the art that various changes and modifications can be made therein without departing from the spirit and scope thereof.

This application is based on Japanese patent application filed on Dec. 7, 2000 (Japanese patent application No. 2000-372241), the entire contents thereof being hereby incorporated by reference.

INDUSTRIAL APPLICABILITY

According to the present invention, decrease in thiol-containing amino groups in a resin during preservation can be inhibited by packing a modified sulfonic acid-type cation-exchange resin, in which a thiol-containing amine compound is bonded via ionic bonds to part of the sulfonic acid groups, together with water into a container while regulating the surface area of the container to 0.5 m² or less per liter of the resin and then sealing up the container so that the resin is preserved in a state of being soaked in water.

What is claimed is:

1. A method of preserving a sulfonic acid-type cation-exchange resin modified with a thiol-containing amine compound characterized by packing a modified sulfonic acid-type cation-exchange resin, in which a thiol-containing amino compound is bonded via ionic bonds to part of the sulfonic acid groups, together with water into a container while regulating the surface area of the container to 0.5 m² or less per liter of the resin and then sealing up the container so that the resin is preserved in a state of being soaked in water.

2. The preserving method as claimed in claim 1 characterized by packing the modified sulfonic acid-type cation-exchange resin in a container while regulating the surface area of the container to 0.05 m² or less per liter of the resin.

3. The preserving method as claimed in claim 1 characterized by packing the modified sulfonic acid-type cation-exchange resin in a container while regulating the surface area of the container to 1 m² or less per mole of the thiol group in the resin.

4. The preserving method as claimed claim 1 characterized in that the thiol-containing amino compound is an ω-pyridylalkanethiol and 2 to 40% of the sulfonic acid groups in the sulfonic acid-type cation-exchange resin have been modified.

* * * * *